US007580762B2

(12) United States Patent
Abrams et al.

(10) Patent No.: US 7,580,762 B2
(45) **Date of Patent: *Aug. 25, 2009**

(54) MICROPHONE WITH ULTRASOUND/AUDIBLE MIXING CHAMBER TO SECURE AUDIO PATH

(75) Inventors: Thomas A. Abrams, Snohomish, WA (US); Theodore C. Tanner, Jr., Hollywood, SC (US)

(73) Assignee: Microsoft Corporation, Redmond, WA (US)

( * ) Notice: Subject to any disclaimer, the term of this patent is extended or adjusted under 35 U.S.C. 154(b) by 972 days.

This patent is subject to a terminal disclaimer.

(21) Appl. No.: 10/992,057

(22) Filed: Nov. 18, 2004

(65) Prior Publication Data

US 2006/0045287 A1 Mar. 2, 2006

Related U.S. Application Data

(63) Continuation of application No. 10/930,493, filed on Aug. 31, 2004, now Pat. No. 7,502,481.

(51) Int. Cl.
*G06F 17/00* (2006.01)
*H04R 3/00* (2006.01)

(52) U.S. Cl. .......................... 700/94; 381/111; 381/122

(58) Field of Classification Search ................. 381/122, 381/111, 67, 316, 61, 56, 91, 92, 77, 172, 381/94.7, 95
See application file for complete search history.

(56) References Cited

U.S. PATENT DOCUMENTS

| | | | | |
|---|---|---|---|---|
| 5,159,703 | A * | 10/1992 | Lowery | 455/42 |
| 6,014,239 | A | 1/2000 | Veligdan | |
| 6,697,944 | B1 | 2/2004 | Jones et al. | |
| 7,502,481 | B2 * | 3/2009 | Abrams et al. | 381/111 |
| 2002/0093881 | A1 | 7/2002 | Kane | |
| 2002/0183005 | A1 * | 12/2002 | Yl et al. | 455/41 |
| 2003/0235315 | A1 | 12/2003 | Reesor | |
| 2004/0054894 | A1 | 3/2004 | Lambert | |
| 2004/0078581 | A1 | 4/2004 | Dublish et al. | |

OTHER PUBLICATIONS

Office Action dated Jun. 10, 2008, U.S. Appl. No. 10/930,493, filed Aug. 31, 2004.

Notice of Allowance dated Dec. 31, 2008 in U.S. Appl. No. 10/930,493.

Supplemental Response dated Dec. 11, 2008, U.S. Appl. No. 10/930,493, filed Aug. 31, 2004.

* cited by examiner

*Primary Examiner*—Xu Mei
*Assistant Examiner*—Douglas J Suthers
(74) *Attorney, Agent, or Firm*—Vierra Magen Marcus & DeNiro LLP

(57) ABSTRACT

Methods, microphones, and systems are provided for processing sound waves. The sound waves are detected with a portable device (such as a microphone) and an audio signal representing the sound waves is generated. A security layer is applied to the audio signal within the portable device (e.g., by encrypting the audio signal), so that only authorized entities may access the audio signal. The audio signal is then outputted from the portable device to an external computer, which can remove the security layer to access the audio content within the audio signal.

31 Claims, 2 Drawing Sheets

MICROPHONE WITH ULTRASOUND/AUDIBLE MIXING CHAMBER TO SECURE AUDIO PATH

CROSS REFERENCE TO RELATED APPLICATION

This application is a continuation of commonly assigned U.S. patent application Ser. No. 10/930,493, filed on Aug. 31, 2004, now issued as U.S. Pat. No. 7,502,481.

FIELD OF THE INVENTION

Background of the Invention

In recent years, various types of digital microphones, characterized as such because they output audio signals in digital format, have been developed in order to overcome disadvantages inherent in analog microphones—in particular, the injection of coupling noise, and resulting decrease in signal quality, due to ambient electromagnetic energy, signal attenuations, and filtering in the signal path. Although at least some analog circuitry is eliminated by these digital microphones, thereby resulting in a less noisy output audio signal, many, if not all, of these microphones generate an intermediate analog audio signal, which must be processed by at least one analog component. Thus, such microphones are not true digital microphones in that they are incapable of transforming audible sounds directly into digital audio signals.

Almost all microphones, whether analog or digital, are mechanical in nature in that they use moving elements to create an audio signal. These elements range from long strips of aluminum hung between magnets (Ribbon Microphone), or thin film metallicized membranes suspended in a highly electrically charged cage (Condenser Microphone), to cone shaped diaphragms with wrapped wires that induce voltage when moved in a magnetic field (Dynamic Microphone). In each of these cases, the moving elements may become mechanically stressed over time, thereby reducing the working life of the microphone.

Significantly, known digital microphones, like all microphones, generate non-secure intermediate and/or output audio signals that, if accessed, can be easily transformed back into a coherent audible sound that resembles the audible sound input into the microphone. If protection of the audible sound from unauthorized third parties is desirable, a security layer can be applied to these audio signals downstream from the microphone output. For example, to secure the audio content (e.g., a song), the audio signal can be transformed into a sound file in any one of a variety of formats, such as a Windows® Audio Volume (WAV), Windows® Media Video (WMV), or Moving Picture Experts Group Layer-3 Audio (MP3) file, and protected with a digital rights management (DRM) and enforcement system, which allows only authorized persons to perform certain operations on the audio content.

There are certain situations, however, where protecting the audio content downstream from the microphone may not be sufficient. For example, in the context of a music recording studio, several audio cuts and tracks are typically generated, which are then combined or spliced into a final file version of a song or album. When the final audio version is transferred to the commercial media (e.g., compact disks), the audio content thereon can be protected with a DRM system. However, the raw content (i.e., the audio cuts and tracks) used to produce the final audio version, which may have even more commercial value than the final product, remains unprotected, and thus, can be freely distributed.

In the case where a microphone is being used as a listening device (e.g., for transmitting audio from one location to a remote location), an unauthorized third party could potentially tap into a wire downstream from the microphone, or even within the microphone itself, to access the non-secured audio signal. Also, typical microphones, whether analog or digital, have passive elements that cannot be turned off unless the microphone has a mechanical switch that can be operated (with the exception of the condenser microphone, which requires an external power supply). Thus, with few exceptions, microphones cannot be turned off remotely, and as such, will continuously be on even though their outputs may not be in use. As such, these microphones will indiscriminately generate and transmit audio signals that can potentially be accessed by an unauthorized third party.

There thus remains a need to provide a microphone that does not generate an intermediate or output audio signal that can be easily used by unauthorized persons, that can be remotely deactivated, and that comprises non-moving mechanical elements.

SUMMARY OF THE INVENTION

In accordance with a first aspect of the present inventions, a method of processing ambient sound waves (e.g., audible sound waves) is provided. The method comprises emitting ultrasound waves (e.g., within a range of 100 KHz to 3 MHz), and combining the ambient sound waves and ultrasound waves into heterodyned sound waves. The method further comprises detecting the heterodyned sound waves and generating a sound detection signal containing information relating to the heterodyned sound waves. The heterodyned sound waves can optionally be collimated, so that they can be more easily detected. Notably, the injection of ultrasound waves into the ambient sound waves renders a resulting signal incoherent.

The method further comprises generating an ambient audio signal representing the ambient sound waves at least partially based on the sound detection signal. In some methods, a heterodyned audio signal representing the heterodyned sound waves, is generated. The heterodyned audio signal may be the same sound detection signal generated in response to the detection of the heterodyned audio signal or an intermediate signal derived from the sound detection signal. In either case, the ambient audio signal may be derived from the heterodyned audio signal, e.g., by computing the difference between the heterodyned audio signal and a reference signal used to drive the emission of the ultrasound waves. The ambient audio signal can conveniently be a digital audio signal, or even a streaming audio file, but can be an analog signal as well.

Thus, it can be appreciated that the sound path from the point at which the ambient sound waves are combined with the ultrasound waves to the point at which the ambient audio signal is generated is secured. The method may further comprise applying a security layer to the ambient audio signal, so that only authorized entities may access the ambient audio signal. In this case, a secure ambient audio signal can be transmitted downstream.

In accordance with a second aspect of the present inventions, the previously described method can be incorporated into a microphone. In this case, an ultrasound emitter is used to emit the ultrasound waves, a mixing chamber, such as a hollow cylinder, is used to combine, and optionally collimate, the ambient sound waves with the ultrasound waves in the heterodyned sound waves, and an acoustic detector is used to detect the heterodyned sound waves and generate the sound detection signal. The acoustic detector can be any detector suitable for detecting ultrasound waves, but in some embodiments, the acoustic detector is a solid state device, so that no moving parts are needed. At least one processor, e.g., a digital signal processor (DSP), is used to generate, and optionally apply a security layer, to the ambient audio signal. The processor(s) may optionally be configured for selectively activating and deactivating the microphone in response to remote signals. In this manner, the microphone, if it is used as a listening device, can be turned off when not in use in order to decrease the chances that an unauthorized third party could listen in on any happenings at the microphone location. The transducer, mixing chamber, acoustic detector, and processor(s) can conveniently be contained within a microphone housing.

In accordance with a third aspect of the present inventions, a sound processor, which can be used in a microphone or any other suitable device, is provided. The sound processor may have the same functionality as the processor(s) described above.

In accordance with a first aspect of the present inventions, a method of processing sound waves (e.g., audible sound waves) is provided. The method comprises detecting the sound waves with a portable device (such as a microphone) and generating an audio signal representing the sound waves. In some methods, the sound detection signal is generated in response to the detection of the sound waves, in which case, the audio signal can be generated based at least in part on the sound detection signal. The audio signal can conveniently be a digital audio signal, or even a streaming audio file, but can be an analog signal as well. The method further comprises applying a security layer to the audio signal within the portable device (e.g., by encrypting the audio signal), so that only authorized entities may access the audio signal, and then outputting the secure audio signal from the portable device. Thus, it can be appreciated that the audio signal output from the portable device is immediately protected, and can therefore be transmitted downstream from the portable device without a significant concern that an unauthorized entity could access the audio content contained within the audio signal.

If it is desired to secure the sound path within the portable device, the method may further comprise heterodyning the sound waves with ultrasound waves, generating a heterodyned audio signal representing the heterodyned sound waves, and then deriving the audio signal from the heterodyned audio signal. Notably, the injection of ultrasound waves into the ambient sound waves renders a resulting signal incoherent. Thus, it can be appreciated that, in this case, the sound path from the point at which the sound waves are combined with the ultrasound waves to the point at which the ambient audio signal is generated is additionally secured.

In some methods, the portable device is selectively activated and deactivated in response to remote signals. In this manner, the portable device, if it is used as a listening device, can be turned off when not in use in order to decrease the chances that an unauthorized third party could listen in on any happenings at the location of the portable device.

In accordance with a second aspect of the present inventions, the previously described method can be incorporated into a microphone. In this case, an acoustic detector is used to detect the sound waves. The acoustic detector can be any detector suitable for detecting ultrasound waves, but in some embodiments, the acoustic detector is a solid state device, so that no moving parts are needed. At least one processor, e.g., a digital signal processor (DSP), is used to generate and apply a security layer to the audio signal, and optionally selectively activate and deactivate the microphone.

In accordance with a third aspect of the present inventions, a secured audio system for processing sound waves (e.g., audible sound waves) is provided. The audio system comprises the previously described microphone and an external computer configured for receiving the audio signal from the microphone, removing the security layer from the audio signal, and reading audio content within the audio signal. If the audio signal is encrypted, the external computer can be configured for removing the security layer by decrypting the audio signal with a secret encryption key. The external computer may optionally send signals to the microphone to selectively activate and deactivate it.

In accordance with a fourth aspect of the present inventions, a secured audio system for processing sound waves (e.g., audible sound waves) is provided. The audio system comprises a microphone that is similar to the previously described microphone, with the exception that it configured for sending the encrypted audio signal over an Internet Protocol (IP) network, so that a client computer can receive the encrypted audio signal from the IP network. The audio system further comprises one or more servers configured for authenticating a client computer, and transmitting one or more encryption keys to the client computer if authenticated. The client computer can then use the encryption key(s) to decrypt the encrypted audio signal. In some embodiments, the server(s) are configured for receiving the encrypted audio signal from the IP network, and sending the encrypted digital audio signal to the client computer over the IP network. The server(s) may optionally send signals to the microphone to selectively activate and deactivate it.

In accordance with an eighth aspect of the present inventions, a method of processing sound waves (e.g., audible sound waves) is provided. The method comprises emitting an optical pulse train through the sound waves, so that the optical pulse train is modulated by the sound waves. In some methods, the optical pulse train is emitted along an optical path that is substantially perpendicular to the sound path along which the sound waves travel. The method further comprising sensing the modulated optical pulse train, generating a modulated electrical pulse train in response to the detected modulated optical pulse train, and generating an audio signal representing the sound waves based at least in part on the modulated electrical pulse train. The audio signal can conveniently be a digital audio signal, or even a streaming audio file, but can be an analog signal as well. Preferably, the pulse repetition rate of the optical pulse train is higher than the frequency of the sound waves, so that the sound waves can be accurately sensed. Thus, it can be appreciated that sound waves can be detected with a high resolution and without using moving parts.

In some methods, the sound waves modulate the optical pulse train by increasing time intervals between pulses in the optical pulse train in accordance with the pressure of the sound waves. In this case, the audio signal may be generated based on the time intervals between pulses in the modulated electrical pulse train. In other methods, the optical pulse train is emitted in response to a reference electrical pulse train, in which case, the method further comprises comparing the reference and modulated electrical pulse trains, e.g., by computing the difference between the reference and modulated pulse trains to obtain time interval differences between corresponding pulses in the respective pulse trains The audio signal is then generated based on this comparison.

The method may optionally comprise encrypting the audio signal, so that only authorized entities may access the audio signal. Thus, it can be appreciated that the audio signal is protected, and can therefore be transmitted downstream without a significant concern that an unauthorized entity could access the audio content contained within the audio signal.

If it is desired to secure the sound path before encrypting the audio signal, the method may further comprise heterodyning the sound waves with ultrasound waves, so that the optical pulse train, and thus, the electrical pulse train, is modulated by the heterodyned sound waves. A heterodyned audio signal can then be generated at least partially based on the electrical pulse train, and then the audio signal can be derived from the heterodyned audio signal. Thus, it can be appreciated that, in this case, the sound path from the point at which the sound waves are combined with the ultrasound waves to the point at which the audio signal is generated is additionally secured.

In some methods, the portable device is selectively activated and deactivated in response to remote signals. In this manner, the portable device, if it is used as a listening device, can be turned off when not in use in order to decrease the chances that an unauthorized third party could listen in on any happenings at the location of the portable device.

In accordance with a ninth aspect of the present inventions, the previously described method can be incorporated into a microphone. In this case, an optical source, such as a laser, emits the optical pulse train through the sound waves, and an optical sensor, such as a photo diode (PD), senses the modulated optical pulse train and generates the modulated electrical pulse train. At least one processor, e.g., a digital signal processor (DSP), is used to generate and optionally encrypt the audio signal. The processor(s) may optionally be configured for selectively activating and deactivating the microphone in response to remote signals. In this manner, the microphone, if it is used as a listening device, can be turned off when not in use in order to decrease the chances that an unauthorized third party could listen in on any happenings at the microphone location. The optical emitter, optical sensor, and processor(s) can conveniently be contained within a microphone housing.

In accordance with a tenth aspect of the present inventions, a sound processor, which can be used in a microphone or any other suitable device, is provided. The sound processor may have the same functionality as the processor(s) described above.

In accordance with an eleventh aspect of the present inventions, a method of processing sound waves (e.g., audible sound waves) is provided. The method comprises detecting the sound waves with a portable device (such as a microphone) and generating an audio signal representing the sound waves. The audio signal can conveniently be a digital audio signal, or even a streaming audio file, but can be an analog signal as well. The method further comprises selectively activating and deactivating the portable device in response to remote signals. In this manner, the portable device, if it is used as a listening device, can be turned off when not in use in order to decrease the chances that an unauthorized third party could listen in on any happenings at the location of the portable device.

The method may further comprise encrypting the audio signal, so that only authorized entities may access the ambient audio signal. In this case, a secure audio signal can be transmitted downstream from the portable device. If it is desired to secure the sound path within the portable device, the method may further comprise heterodyning the sound waves with ultrasound waves, generating a heterodyned audio signal representing the heterodyned sound waves, and then deriving the audio signal from the heterodyned audio signal. Notably, the injection of ultrasound waves into the ambient sound waves renders a resulting signal incoherent. Thus, it can be appreciated that, in this case, the sound path from the point at which the sound waves are combined with the ultrasound waves to the point at which the ambient audio signal is generated is additionally secured.

In accordance with a twelfth aspect of the present inventions, the previously described method can be incorporated into a microphone. In this case, an acoustic detector is used to detect the sound waves. The acoustic detector can be any detector suitable for detecting ultrasound waves, but in one embodiment, the acoustic detector is an device, so that it can be electronically turned off. At least one processor, e.g., a digital signal processor (DSP), is used to generate the audio signal, selectively activate and deactivate the microphone, and optionally encrypt the audio signal.

Other features of the present invention will become apparent from consideration of the following description taken in conjunction with the accompanying drawings.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
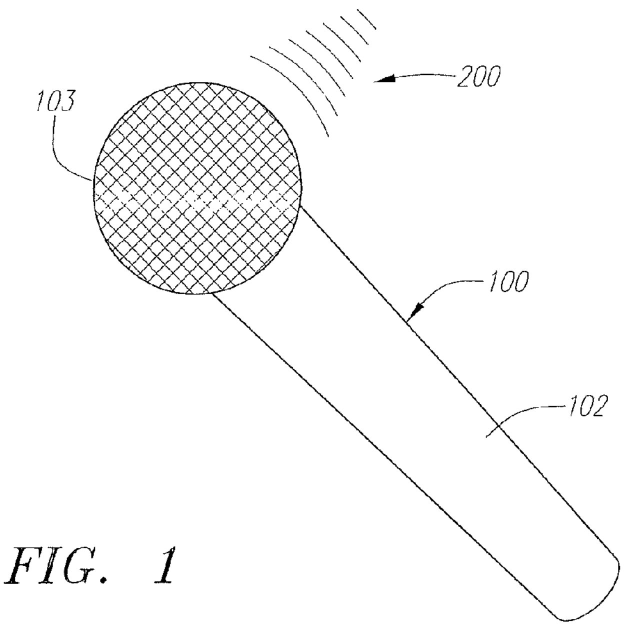
FIG. 1 is an plan view of a microphone constructed in accordance with a preferred embodiment of the present invention.

Referring to FIG. 1, an exemplary microphone 100 constructed in accordance with the present inventions is shown. The microphone 100 is configured for detecting ambient acoustic energy in the form of acoustic waves 200 and outputting a digital steam representing the acoustic waves 200. In the illustrated embodiment, the acoustic waves 200 are audible and may have any dynamic frequency, but are typically in the audible range of 20-20,000 Hz. The ambient waves 200 can come from any source, e.g., vocal sounds from a person. It should be noted, however, that the microphone 100 is not limited to the audible range, but can detect acoustic energy below or above the audible range, depending on the nature of the electronic circuitry therein.

From the outside, the microphone 100 resembles a standard microphone, and includes a tubular housing 102, which in the illustrated embodiment, is configured to be either hand held or mounted to a microphone support. The shape of the housing 102 will ultimately depend on the application of the microphone 100. For example, if used as a listening device, the housing 102 may have a relatively small profile, so that it can be inconspicuously installed at a location to be monitored. The microphone 100 further comprises a screened head 103 suitably mounted to the housing 102 and through which the acoustic waves 200 travel into the interior of the housing 102.

Figure 2:
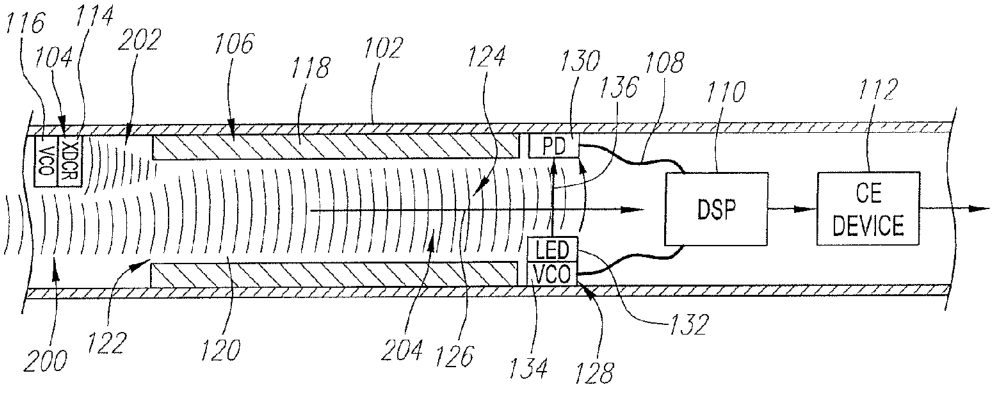
FIG. 2 is a cross-sectional view of the microphone of FIG. 1.

Unlike a typical microphone, the internal components contained within the housing 102 of the microphone 100 operate, such that the entire sound/audio path through the microphone, including the outputted digital stream, is secure. To this end, and with reference to FIG. 2, the microphone 100 generally comprises an ultrasound emitter 104 configured for emitting ultrasound waves 202, a mixing chamber 106 configured for mixing the ambient waves 200 and ultrasound waves 202 to generate heterodyned acoustic waves 204, an acoustic detector 108 configured for detecting the heterodyned acoustic waves 200, a sound processor 110 configured for generating a digital audio signal based on the detected heterodyned waves 200, and applying a security layer to the audio signal, and an optional communications device 112 configured for transforming the digital audio signal into a streaming audio file, communicating with remote devices, and selectively deactivating/activating the microphone 100 in response to remote signals.

In the illustrated embodiment, the ultrasound emitter 104 comprises an ultrasound transducer 114 composed of any suitable piezoelectric material, such as Lead Zirconate Titanate (PZT), and an electrical oscillator 116, e.g., a voltage controlled oscillator, that drives the ultrasound transducer 114 with electrical signals (e.g., pulse sequences), such that the transducer 114 emits the ultrasound waves 202 at the same frequency as the electrical signals. Preferably, the frequency of the ultrasound waves 202 is well above the audible frequency range, e.g., within the 100 KHz to 3 MHz range, but preferably around 1 MHz. In any event, the frequency at which the ultrasound transducer 114 emits the ultrasound waves 202 is fixed and predictable for reasons that will be described in further detail below. Preferably, the magnitude of the ultrasound waves 202 are of the same order as the magnitude of the ambient waves 200 received by the microphone 100, e.g., within the 80-120 dB range.

The mixing chamber 106 comprises a hollow cylinder 118 that internally extends along a portion of the microphone housing 102. The hollow cylinder 118 forms a cavity 120 therein that includes an input 122 at the front end of the cylinder 118 into which the ultrasound waves 202 emitted by the ultrasound transducer 114 and the ambient waves 200 entering through the screened head 103 may enter. The mixing chamber cylinder 118 is composed of a rigid acoustically conducting material, such as metal or plastic, so that the ambient waves 200 and ultrasound waves 202 mix as they travel through the cavity 120. The cavity 120 has an output 124 at the back end of the cylinder 118 out from which the mixed ambient waves 200 and ultrasound waves 202 exit as heterodyned acoustic waves 204 along a sound path 126 towards the acoustic detector 108.

Advantageously, the heterodyned waves 204 will be incoherent due to the interference or noise injected therein by the ultrasound waves 202, so that even if a third party were to tap into the microphone 100 at the output 124 of the mixing chamber 106, the ambient waves 200 contained within the heterodyned acoustic waves 200 could not be easily detected. In addition to mixing the ambient waves 200 and ultrasound waves 202 to generate the heterodyned waves 204, the mixing chamber 106 also serves to collimate the heterodyned waves 204 towards the acoustic detector 108, thereby maximizing the sensitivity of the microphone 100.

The acoustic detector 108 is a high resolution detector that is capable of detecting sound waves at ultrasonic frequencies. In the illustrated embodiment, the acoustic detector 108 is a solid-state device (i.e., it comprises no moving parts) and is laser-based. In particular, the acoustic detector 108 comprises an optical pulse source 128 and a optical pulse sensor 130. In the illustrated embodiment, the optical pulse source 128 comprises a laser device 132, such as a light emitting diode (LED), and an electrical oscillator 134, e.g., a voltage controlled oscillator, that drives the laser device 132 with an electrical pulse train, such that the laser device 132 emits a corresponding optical pulse train. In the illustrated embodiment, each pulse is transmitted at a wavelength of approximately 1.5 micrometers, and has a suitable pulse width, e.g., 10 psec. The repetition rate of the optical pulse train is preferably much higher than the frequency of the emitted ultrasound waves 202, e.g., 1 GHz. The optical pulse sensor 130 may comprises any suitable device capable of receiving the optical pulse train from the pulse source 128 and, in response thereto, generating an electrical pulse train that accurately represents the received optical pulse train. In the illustrated embodiment, the pulse sensor 130 takes the form of a photodiode (PD).

The optical pulse source 128 and optical pulse sensor 130 are affixed relative to each, e.g., by mounting them to the inside surface of the microphone housing 102, and are arranged on opposite sides of the sound path 126, such that the optical pulse train emitted by the pulse source 128 travels along a light path 136 though the heterodyned acoustic waves 200 at a perpendicular angle to the sound path 126. As a result, the optical pulse train is modulated by the acoustic waves 200, in which case, the electrical pulse train generated by the pulse sensor 130 will be a modulated electrical pulse train that represents the modulated optical pulse train received by the pulse sensor 130.

Figure 3:
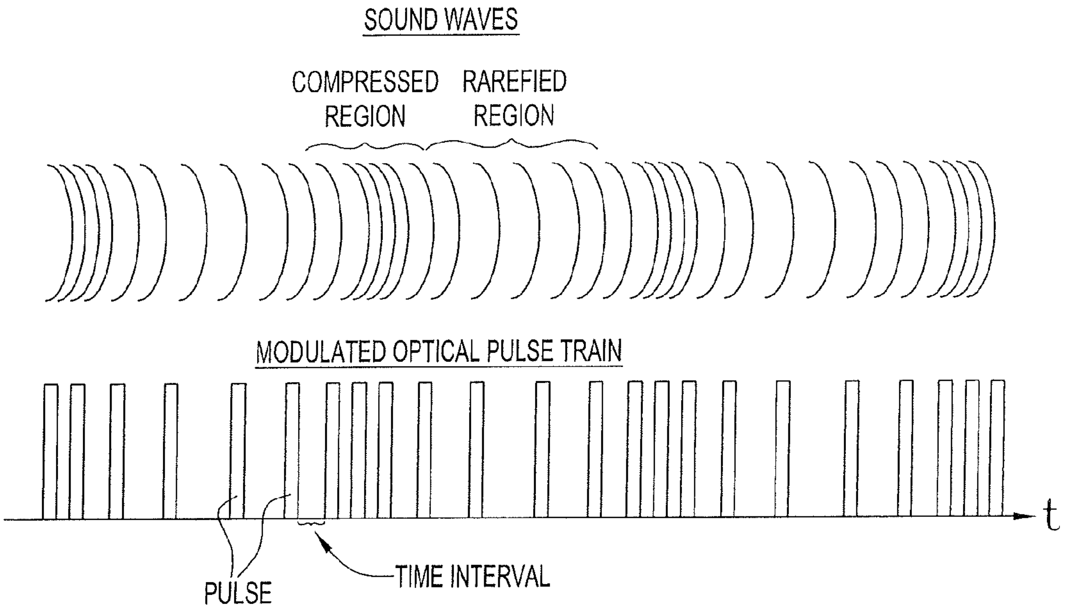
FIG. 3 are timing diagrams showing the correlation between sound waves and the modulation of an optical pulse train traveling through the sound waves.

With reference to FIG. 3, the correlation between sound waves and the modulation of an optical pulse train traveling through the sound waves will be described. Because sound waves are pressure waves, a series of sound waves will oscillate in pressure from a high pressure (where the sound waves are more compressed) to a low pressure (wherein the sound waves are more rarefied). Notably, the amplitude of sound is characterized by the amplitude of the maximum compression along the sound waves, while the pitch of the sound is characterized by the frequency of the pressure oscillations. Because the speed of light decreases with the density of the medium through which it passes, the time intervals between the optical pulses passing through the sound waves will also decrease as the sound waves become more compressed (or will increase as the sound waves become more rarefied).

Thus, as shown in FIG. 3 (which, for purposes of illustration, exaggerates the variation between time intervals), the lengths of the time intervals between the optical pulses oscillate in accordance with the pressure oscillations within the sound waves. That is, the greatest time intervals between pulses corresponds to the points along the sound, waves where the greatest rarefaction occurs, whereas the smallest time intervals between pulses corresponds to the points along the sound waves where the greatest compression occurs. Therefore, the modulated optical pulse train, and thus, the modulated electrical pulse train generated by the pulse sensor 130, will contain information relating to the amplitude and frequency of the heterodyned acoustic waves 200 output by the mixing chamber 106. In order to expand the time interval scale, thereby increasing the sensitivity of the acoustic detector 108, the optical pulse train can be passed through the acoustic waves 200 several times (e.g., using mirrors (not shown)) to laterally reflect the optical pulse train between opposite sides of the sound path 126, each time being further modulated by the acoustic waves 200.

Referring back to FIG. 2, the sound processor 110 preferably takes the form of a digital signal processor (DSP) that is programmed to perform various functions. In particular, the sound processor 110 is configured to receive the modulated electrical pulse train from the optical pulse sensor 130 and internally derive a digital audio signal that represents the heterodyned acoustic waves 200 output from the mixing chamber 106 at least partially based on the modulated electrical pulse train received from the optical pulse sensor 130. In the illustrated embodiment, the sound processor 110 receives the electrical pulse train used to drive the optical pulse source 128 and compares this reference signal with the modulated electrical pulse train obtained from the pulse sensor 130.

In particular, the sound processor 110 calculates the time difference between each pulse within the modulated electrical pulse train and the corresponding pulse within the reference electrical pulse train. These time differences will track the alternating pressure compression and rarefaction of the heterodyned acoustic waves 200, with the greater time differences corresponding to the more compressed regions within the heterodyned acoustic waves 200 and the lesser time differences corresponding to the more rarefied regions within the heterodyned acoustic waves 200. Based on this principle, the sound processor 110 reconstructs a digital heterodyned audio signal representing the heterodyned acoustic waves 200.

Notably, because the optical pulses travel through the air at a speed that is on the same order as the speed at which electrical pulses travel through wire, the signal paths between the respective optical pulse emitter and sensor 128/130 and the sound processor 110 must be taken into account when determining the differences between the pulses in the modulated electrical pulse train and the corresponding pulses in the reference electrical pulse train. Any difference between the respective signal paths must be accounted to obtain the actual time difference between corresponding pulses. Any difference between the signal paths can be determined by calibrating the microphone 100, e.g., by operating the acoustic detector 108 in the absence of any sound (ambient or ultrasound) traveling through the mixing chamber 106, and measuring the time difference between a pair of corresponding pulses in the electrical signal trains received from the optical source/sensor 128/130 pair.

Next, the sound processor 110 internally generates an digital ambient audio signal representing the acoustic waves 200 input into the mixing chamber 106 at least partially based on the digital heterodyned audio signal. In the illustrated embodiment, the sound processor 110 receives the electrical signal used to drive the ultrasound transducer 114, digitizes this reference signal, and then subtracts the digitized reference signal from the digitized heterodyned audio signal to obtain the digital ambient audio signal.

Next, the sound processor 110 applies a security layer to the ambient audio signal, so that only authorized persons have access to the audio content contained within the audio signal, as will be described in further detail below. In the illustrated embodiment, the security layer is applied by encrypting the digital audio signal, so that only devices that possess a correct encryption key can access the audio content within the audio signal. The encryption can either be symmetrical or asymmetrical. Depending on the means for delivering the audio content, the encryption key can be carefully provided to an authorized entity in the context of a DRM system.

As previously mentioned, the communication processor 112 is optional, and lends itself well to applications where communication over an Internet Protocol (IP)—network (such as the Internet) is desired. The communications processor 112, which, in the illustrated embodiment, takes the form of a Windows® CE embedded chip, transforms the encrypted audio signal output from the sound processor 110 into a streaming audio file (e.g., a WAV, WMV, or MP3 file), which is then packetized for delivery over the IP network to a remote site. To this end, the microphone 110 may have a 10-Base T connection (not shown) for connection to the IP network. The communications processor 112 provides communications between the microphone 110 and another IP devices, such as a server or client computer, so that the streaming audio file can be transmitted when requested, as will be described in further detail below. As will also be described in further detail below, the communication processor 112, in response to a remote request, may also selectively activate and deactivate the microphone 100 by turning the sound processor 110 and/or acoustic detector 128 on and off, e.g., using a relay switch (not shown). It should be noted that although the sound processor 110 and communications processor 112 are shown as to distinct elements, their functionality can be combined into a single device without straying from the principles taught herein.

The microphone 100 can be used in any one of a variety of scenarios where secured audio signals are desired. For example, the microphone 100 can be used in a recording studio where it is desired to protect raw audio content from unauthorized use. In this scenario, the communication processor 112 may not be needed, since the microphone 100 will typically be connected directly to a storage device, and any transformation of the digital audio signal into a streaming audio file would presumably be accomplished by an external computer. Of course, in a virtual recording studio where it is possible to download the audio signal to a storage device over an IP network, it may be desirable to include the communications processor 112 within the microphone 100, as will be described in further detail below.

In an actual recording studio, a DRM system can be implemented, whereby only a specific computer with a secret encryption key can be used to access the audio content within the encrypted audio signal. In this case, the encrypted digital audio signal is output from the microphone 100 into a computer, where it may be transformed into a streaming audio signal and stored on a suitable medium. The computer that generates the final version of the audio content, which may be the same computer that generates the raw audio files, can then decrypt the raw audio files using the secret encryption key, so that the final version of the audio content can be created. The final version of the audio content can then be applied to the media, such as CDs, in its unencrypted form, and commercially distributed to the public. Significantly, any non-finalized version of the content (i.e., the raw audio files) cannot be decrypted without the secret encryption key, and thus, would be protected from unauthorized commercialization.

As briefly mentioned above, the microphone 100 may be used to download audio content over an IP network, e.g., in the context of a virtual recording studio or when the microphone 100 is simply used as a listening device. In this case, a remote device, e.g., a network server, may prompt the communications device 112 of the microphone 100 to transmit the packetized audio file over the IP network to the remote device. The same remote device can be used to apply DRM control to the audio content of the audio file and to selectively activate/deactivate the microphone 100.

Figure 4:
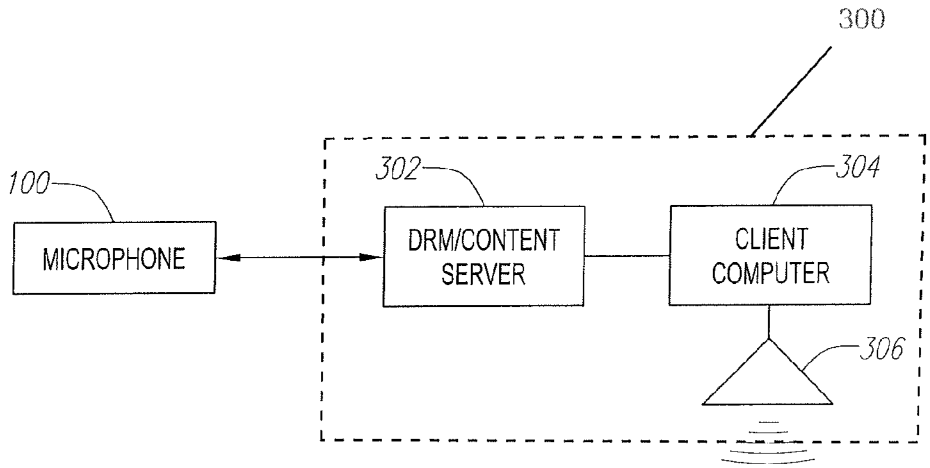
FIG. 4 is a functional block diagram of a server system used to provide Digital Rights Management (DRM) control to the transmission of an audio signal from the microphone of FIG. 1 to a client computer.

For example, FIG. 4 illustrates a DRM controlled server system 300 comprising a DRM/content server 302 and a client computer 304 having a speaker 306. The DRM/content server 302 is configured for authenticating the client computer 304, receiving the encrypted audio file from the microphone 100, and providing it, along with encryption key(s), to the client computer 304. The DRM/content server 302 is also configured for activating/deactivating the microphone 100. In certain circumstances, it may be desirable to have two servers, e.g., a DRM server that authenticates and provides encryption key(s) to the client computer, as well as activating/deactivating the microphone 100, and an audio content server for obtaining the audio file from the microphone 100 and providing it to the authenticated client computer 304. For purposes of brevity, however, only a single server will be described as performing these function.

When an authorized user desires to listen in on the sounds at the location where the microphone 100 is installed, he or she can log into the DRM/content server 302. Upon proper user authentication, the user may request the microphone 100 to be turned on or activated, e.g., by clicking an icon on the client computer 304. In response, the DRM/content server 302 will send the appropriate encryption key(s) to the client computer 304 and will send a request to the communications processor 112 to turn on the active components of the microphone 100; namely, the acoustic detector 108 and/or the sound processor 110. Upon receipt of this request, the microphone 100 will be turned on, in which case, the communications processor 112 will output and send the encrypted streaming audio file to the DRM/content server 302. The DRM/content server 302 will then send the streaming audio file to the client computer 304, which will then, using the encryption key(s), decrypt the file as it is received, transform it into an analog audio signal, and send it to the speaker 306, where it is transformed into audible acoustic waves for the user.

When the user is finished listening, he or she may request the remote microphone 100 to be turned off, e.g., by clicking an icon on the client computer 304. In response, the DRM/content server 302 will send a request to the communications processor 112 to turn off the active components of the microphone 100. Upon receipt of this request, the microphone 100 will be turned off, in which case, the communications processor 112 will cease sending the encrypted streaming audio file to the DRM/content server 302.

In certain situations, it may be desirable to remotely activate/deactivate the microphone 100 outside of an IP network environment. In this case, the communications processor 112 may not be needed, and the microphone 100 may send the encrypted digitized audio signal directly from the sound processor 110 to the remote site over a passive line. The remote site can activate/deactivate the microphone 100 by sending signals, e.g., in the form of metadata, to the sound processor 110, which may then turn the microphone 100 on or off.

Although particular embodiments of the present invention have been shown and described, it will be understood that it is not intended to limit the present invention to the preferred embodiments, and it will be obvious to those skilled in the art that various changes and modifications may be made without departing from the spirit and scope of the present invention. Thus, the present inventions are intended to cover alternatives, modifications, and equivalents, which may be included within the spirit and scope of the present invention as defined by the claims.

What is claimed is:

1. A method for processing sound waves, comprising:

providing a portable microphone having a head portion, a housing, and a mixing chamber within the housing, wherein the mixing chamber includes an input and an output;

receiving ambient sound waves via the head portion of the portable microphone;

heterodyning the ambient sound waves entering the input of the mixing chamber with ultrasound waves;

generating a digital audio signal representing the heterodyned sound waves exiting the output of the mixing chamber;

encrypting the digital audio signal, whereby only authorized entities may access the encrypted digital audio signal; and outputting the encrypted digital audio signal from the portable microphone.

2. The method of claim 1, wherein the sound waves are audible sound waves.

3. The method of claim 1, wherein the digital audio signal is a streaming audio signal.

4. The method of claim 1, further comprising selectively activating and deactivating the portable microphone in response to remote signals.

5. The method of claim 1, wherein the portable microphone is a hand-held microphone.

6. A method for processing sound waves, comprising:

providing a portable microphone having a head portion, a housing and a mixing chamber within the housing, wherein the mixing chamber includes an input and an output;

detecting the sound waves with the head portion of the portable microphone;

emitting ultrasound waves into the input of the mixing chamber such that the ultrasound waves mix with the sound waves as the ultrasound waves and sound waves travel through the mixing chamber creating heterodyned acoustic waves exiting the output of the mixing chamber;

generating a sound detection signal containing information relating to the heterodyned acoustic waves exiting the output of the mixing chamber;

generating an encrypted audio signal based at least in part on the sound detection signal; and outputting the encrypted audio signal from the portable microphone.

7. The method of claim 6, wherein the sound waves are audible sound waves.

8. The method of claim 6, wherein the encrypted audio signal is a digital audio signal.

9. The method of claim 6, wherein the encrypted audio signal is a streaming audio file.

10. The method of claim 6, further comprising selectively activating and deactivating the portable microphone in response to remote signals.

11. The method of claim 6, wherein the portable microphone is a hand-held microphone.

12. A portable microphone for processing sound waves, comprising:

a housing having an interior for receiving sound waves;

a mixing chamber within the interior of the housing, the mixing chamber having an input and on output;

an emitter within the interior of the housing, the emitter emitting ultrasound waves into the mixing chamber input;

an acoustic detector contained within the interior of the housing, the acoustic detector configured for detecting the sound waves, mixed with the ultrasound waves, exiting the mixing chamber output; and at least one processor contained within the interior of the housing and configured for generating an audio signal representing the sound waves mixed with the ultrasound waves exiting the mixing chamber output, and applying a security layer to the audio signal, whereby only authorized entities may access the audio signal.

13. The portable microphone of claim 12, wherein the security layer is applied by encrypting the audio signal.

14. The portable microphone of claim 12, wherein the sound waves are audible sound waves.

15. The portable microphone of claim 12, wherein the acoustic detector is a solid-state device.

16. The portable microphone of claim 12, wherein the at least one processor comprises a digital signal processor (DSP).

17. The portable microphone of claim 12, wherein the audio signal is a digital audio signal.

18. The portable microphone of claim 12, wherein the audio signal is a streaming audio file.

19. The portable microphone of claim 12, wherein the at least one processor is configured for selectively activating and deactivating the microphone in response to remote signals.

20. The portable microphone of claim 12, wherein the housing is handheld.

21. A secured audio system for processing sound waves, comprising:

a microphone configured for detecting acoustic waves, heterodyning the acoustic waves, generating a digital audio signal representing the heterodyned acoustic waves, encrypting the digital audio signal, and outputting the encrypted digital audio signal; and an external computer configured for receiving the encrypted digital audio signal, decrypting the digital audio signal, and reading audio content within the digital audio signal.

22. The audio system of claim 21, wherein the microphone is configured for applying the security layer by encrypting the audio signal, and wherein the external computer is configured for removing the security layer by decrypting the audio signal with a secret encryption key.

23. The audio system of claim 21, wherein the digital audio signal is a streaming audio signal file.

24. The audio system of claim 21, wherein the microphone is configured to be selectively activated and deactivated in response to signals from the external computer.

25. The audio system of claim 21, wherein the microphone is a hand-held device.

26. A secured audio system for processing sound waves, comprising:

a microphone having a body containing a mixing chamber that including an input and an output, the microphone configured for receiving sound waves via the mixing chamber input, injecting ultrasound waves into the mixing chamber, generating a sound detection signal containing information relating to the mix of ultrasound waves and sound waves exiting the mixing chamber output, generating an encrypted digital audio signal representing the mix of ultrasound waves and sound waves at least partially based on the sound detection signal, and sending the encrypted digital audio signal over an Internet Protocol (IP) network to a client computer;

one or more servers configured for authenticating a client computer, and transmitting one or more encryption keys to the client computer if authenticated, whereby the client computer can use the one or more encryption keys to decrypt the encrypted digital audio signal sent by the microphone.

27. The audio system of claim 26, wherein the one or more servers is configured for receiving the encrypted digital audio signal from the IP network, and sending the encrypted digital audio signal to the client computer over the IP network.

28. The audio system of claim 27, wherein the sound waves are audible sound waves.

29. The audio system of claim 27, wherein the encrypted digital audio signal is a streaming audio file.

30. The audio system of claim 27, wherein the microphone is configured to be selectively activated and deactivated in response to a signal from the one or more servers.

31. The audio system of claim 27, wherein the microphone is a hand-held device.

* * * * *

UNITED STATES PATENT AND TRADEMARK OFFICE

CERTIFICATE OF CORRECTION

PATENT NO. : 7,580,762 B2
APPLICATION NO. : 10/992057
DATED : August 25, 2009
INVENTOR(S) : Abrams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this

Fourteenth Day of December, 2010

David J. Kappos
*Director of the United States Patent and Trademark Office*